July 12, 1927.
H. J. BRAGDON
1,635,529
SEAL FOR VESSELS AND THE LIKE
Filed March 18, 1926
2 Sheets-Sheet 1
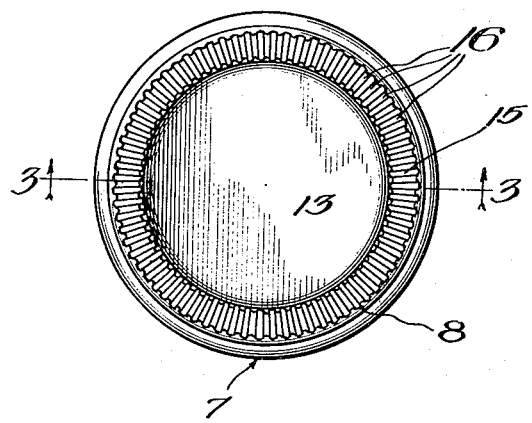
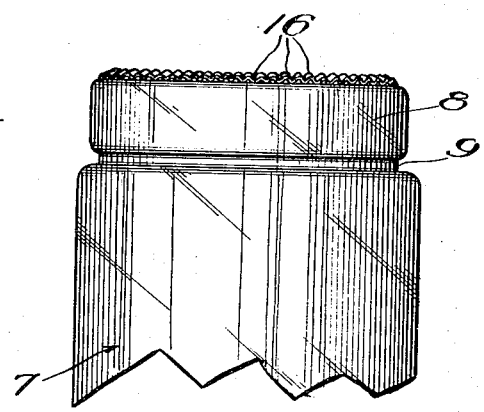
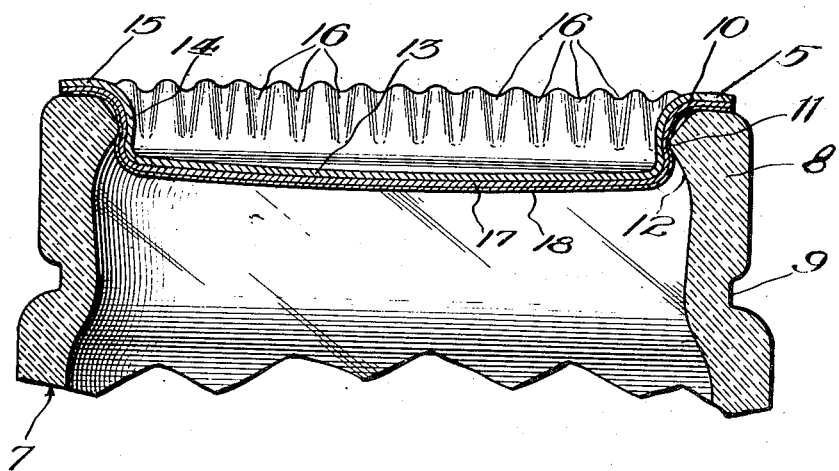
Inventor:
Herbert J. Bragdon
by Thos. A. Banning Jr.
Atty July 12, 1927.
H. J. BRAGDON
1,635,529
SEAL FOR VESSELS AND THE LIKE
Filed March 18, 1926
2 Sheets-Sheet 2
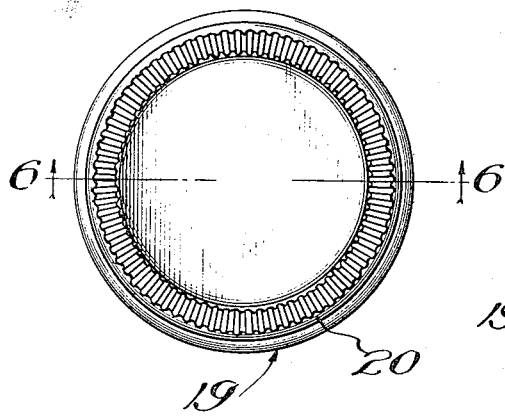
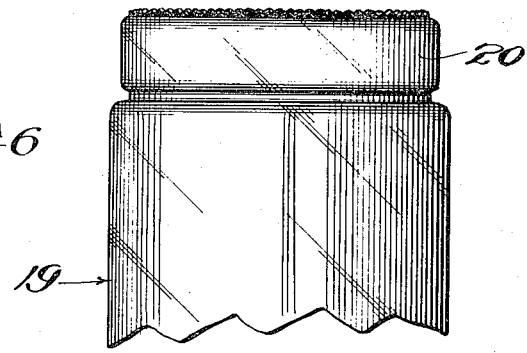
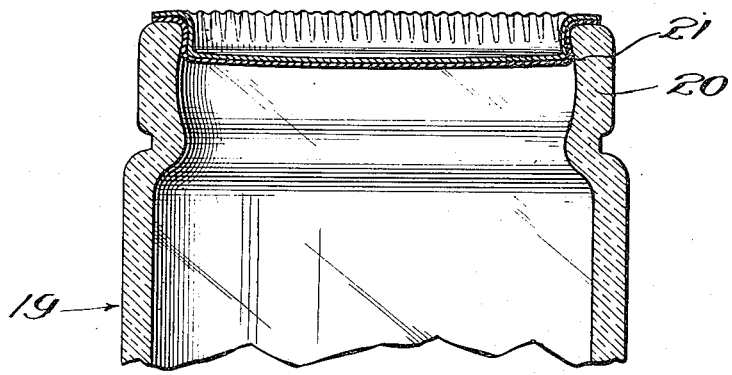
Inventor:
Herbert J. Bragdon,
by Thos. A. Banning
Atty Patented July 12, 1927.

UNITED STATES PATENT OFFICE.

HERBERT J. BRAGDON, OF CHICAGO, ILLINOIS.

SEAL FOR VESSELS AND THE LIKE.

Application filed March 18, 1926. Serial No. 95,671.

The present invention has to do with improvements in seals for vessels and the like. The invention relates particularly to improvements in seals for glass and other vitreous jars, such as jars for mayonnaise dressing, etc. It will be seen, however, that seals embodying the features of the present invention may also be used for many other purposes and in connection with other forms and kinds of vessels.

The main object of the invention is to provide an extremely simple and efficient form of seal for the above purposes in particular. In this connection, it is an object to provide a seal which can be readily formed as a sheet metal stamping by the use of dies and other standard forms of machinery operating in a simple manner.

Another object of the invention is to provide a construction of seal which can be very easily and perfectly applied to the jar without having to use special machinery for such purpose.

Another object is to provide a seal which will very efficiently maintain either the vacuum or pressure which it is desired to have within the vessel.

Another object of the invention is to provide a construction of seal which may be efficiently used as a reseal, that is, one which is so constructed that the closure may be reapplied to the vessel irrespective of the exact position of the original application, and at the same time when so reapplied will produce a very efficient seal. In other words, the closure itself can be applied to the vessel with equal advantage in any position, and without the necessity of reapplying in identically the same position in which it was originally applied.

More particularly it is an object of the invention to provide a seal comprising a sheet metal cap which is adapted to set down into the upper end of the mouth of the vessel, said cap being provided with an upwardly extending flange as an integral portion thereof, and said flange being of slightly larger size than the opening into which it is to be applied. The flange is in turn serrated or corrugated so as to provide it with such an amount of resiliency as will permit the cap to be forced into place within the slightly smaller opening of the jar. The corrugations or serrations of the flange itself establish therein such a degree of flexibility at all points around the circle as to allow the flange to flex uniformly and thus be forced into the slightly smaller opening without an accumulation of buckling at any given point.

It may, therefore, be stated that a further object of the invention is to establish a closure having the necessary flexibility around the entire circle to ensure proper entrance of the cap into the opening without danger of buckling at any point.

Still another object of the invention is to provide a surfacing of paper or other similar fibrous material on the cap, which surfacing is of proper thickness to establish a cushioning effect so as to assist in forming a perefect seal; and the surface which is exposed to direct contact with the contents of the jar is so treated as to be impervious to the action of the materials contained within the jar.

In the preferred arrangement, this fibrous surfacing comprises two layers of paper, the layer which is in direct contact with the metal cap being preferably thicker than the outside layer and establishing the desired cushioning, and the outside relatively thinner layer being treated with suitable oil or other material to render it impervious to the effects of the materials contained within the jar.

Another feature of the invention relates to the provision of an outwardly extending lip on the upper edge of the flange aforesaid, said lip being adapted to lie immediately above the top edge of the jar. In this location it will serve not only to limit the downward movement of the cap when being set into place in the jar, but will also provide a convenient element for manipulation by a knife or other tool which is used for removing the cap from the jar.

Other objects and uses of the invention will appear from a detailed description of the same, which consists in the features of construction and combinations of parts hereinafter described and claimed.

In the drawings:

Figure 1 shows a plan view of a cap embodying the features of the present invention in place on the upper end of a jar;

Fig. 2 is a side view corresponding to Fig. 1, the lower portion of the jar being broken away;

Fig. 3 is a cross section taken on the line 3—3 of Fig. 1, looking in the direction of the arrows, but on enlarged scale;

Fig. 4 is a view similar to Fig. 1, but illustrating the cap as applied to another slightly different form of jar;

Fig. 5 is a side view corresponding to Fig. 4, the lower portion of the jar being broken away; and Fig. 6 is a cross section on the line 6—6 of Fig. 4, looking in the direction of the arrows, but on enlarged scale.

Referring first to Figs. 1, 2 and 3, the jar in its entirety is designated by the numeral 7. It has a relatively large mouth or opening within a practically straight neck 8. Frequently, a groove 9 is formed around the lower portion of the neck 8, although the cap to which the present invention particularly relates may be used with jars either with or without the groove 9.

The type of jar illustrated in Figs. 1, 2 and 3 is one in which a beveled surface 10 is formed around the upper end of the opening during the process of manufacturing the jar. This process is such that co-incidentally with the provision of this beveled surface 10 there will be established an inwardly projecting bead or enlargement 11 around the upper inner surface of the neck. As a result thereof, the inner surface of the jar retreats from the lower portion of the bulge 11, as shown at 12 in Fig. 3.

The cap of the present invention is particularly intended for use in connection with jars having mouths formed as shown in Fig. 3, although manifestly they may be used in connection with other forms of container. Nevertheless, there is a peculiar co-operation and relationship between the cap and the type of jar illustrated in Fig. 3.

This cap comprises a sheet metal stamping which is so formed as to provide a dished floor 13 which is slightly concave upwards. Around the edge of this floor there is established an upwardly extending flange 14 which slants inwards on a very slight angle, and preferably the upper edge of the flange 14 is turned upwardly into a horizontal lip 15.

The flange 14 and the lip 15, when provided, are provided with a series of relatively small closely placed serrations 16 which are easily established by crimping the sheet metal. These serrations commence at a point relatively close to the floor 13 and continue upwards along the flange 14 and over the lip 15. They are of sufficient number and are of such relatively small size that upon occasion the flange can be forced inwards a slight amount around the entire circle without danger of buckling. Under these conditions, the slight flexing necessary in the flange will be provided by the serrations.

The flange 14 is of sufficient depth, so that when the cap is forced home into the position of Fig. 3, its floor 13 will set some distance below the position of the bead 11, and the serrations aforementioned preferably reach down to a point where they will either come into line with or slightly below the bead 11. This will ensure a more perfect and satisfactory flexing operation such as has already been referred to.

The sheet metal cap could, perchance, be used for direct insertion into the mouth of the vessel, but I prefer to coat its outer surface with a layer or layers of paper or other similar fibrous material. Usually there will be provided two such layers designated 17 and 18, respectively, in Fig. 3. The layer 17, which is in direct contact with the sheet metal, is preferably somewhat thicker than the layer 18 and is preferably untreated, so that it will more perfectly retain its cushioning or padding qualities. On the other hand, the layer 18 is preferably treated with a suitable material such as a properly selected oil so as to give it a firmer surface and also render it impervious to attack by the contents of the jar.

The layers 17 and 18 are preferably carried up along the flange 14 and beneath the lip 15. By carrying these layers up along the flange 14 a sufficient distance, the beneficial effect of the paper layers will be secured at the point where the closure comes into contact with the bead 11. This fact is clearly illustrated in Fig. 3, wherein it will be noted that paper layers are shown as being slightly indented by the bead 11.

In connection with the above, I wish to state that the thickness of the sheet metal and the paper layers is shown exaggerated in Fig. 3 for purposes of better illustration.

Ordinarily, the sheet metal will comprise a sheet of steel which is tin coated and has a thickness of approximately .007″ to .009″. Metal of this thickness will have sufficient flexibility to allow it to be readily set into the opening of the jar without the need of applying an excessive force, such as would permanently distort it or damage it.

Preferably also the paper layers 17 and 18 are made of what is known as Kraft paper, which is a wood pulp paper. The inner sheet is preferably of a thickness of substantially .011″ and the outer sheet of a thickness of substantially .007″. As before stated, the outer sheet should be preferably oiled or otherwise treated to resist the contents of the bottle.

The flexing effect of the flange 14 will be better appreciated when I state that a cap of substantially 2.530″ will be forced into a jar having an opening of substantially 2.480″ diameter. The cap will necessarily contract approximately .050″, which is provided for by the crimping already referred to.

The cap illustrated in Figs. 4, 5 and 6 is of the same construction as that already described more in detail. For purposes of convenience, however, the paper coating is shown by a single thickness of cross hatching. This may be taken to indicate either a single or double thickness of paper, although ordinarily two thicknesses will be used, as already explained.

In the construction of Figs. 4, 5 and 6, the cap is shown as being applied to a jar 19, the neck 20 of which has its inner surface 21 formed on a fairly smooth slant throughout the upper portion of the opening, there being no distinct bead, such as the bead 11 of Figs. 1, 2 and 3. When the cap is forced home into the jar of Figs. 4, 5 and 6, it will take against the surface 21 and will expand slightly as it is forced downwards, such expansion being permitted by the flexibility established by crimping.

Reference particularly to Fig. 3 will show that the encircling bead 11 of the jar compresses the layers 17 and 18 of lining material substantially without any deflection of the thickness of the sheet metal 13 itself. In other words, the compressibility of the layers of lining material may be relied upon for establishing the necessary yield under compression in order to insure a perfect seal at all points around the entire circumference.

It will also be noted, especially from Fig. 3, that a portion of the lining material is forced under the bead 11, so that any pressure exerted by the contents of the jar will improve the sealing action by the presence of this extra lining material immediately beneath the position of the bead 11.

After the cap has been forced into place and the lining material has had an opportunity to permanently set in the new location, the groove which is formed for the accommodation of the bead 11 will become more or less permanent and greatly assist in retaining the cap in place.

Preferably, the outer layer of liner is impregnated with oil or otherwise treated, as has already been explained herein. In many cases it will be found advantageous to also treat the layer with a coating of wax, such as paraffin, so as to fill up any pores and thereby materially improve its vacuum-retaining qualities.

When the liner is impregnated with wax there is frequently left a thin film of wax on the surface of the paper. In those cases in which the seal is to be used in jars having hot contents, it is preferred to scrape or otherwise remove the surplus wax from the surface of the central portion of the liner, leaving the surplus wax on the marginal portion thereof. By so doing, the surface wax on the marginal portion will come into contact with the bead 11 when the seal is forced into place in the jar, so as to materially assist the sealing qualities; and at the same time, by eliminating the surplus wax from the central portion of the seal, there is no danger of the wax becoming melted and working down into the contents of the jar.

While I have herein shown and described only certain embodiments of the features of my present invention, still I do not intend to limit myself to the same, except as I may do so in the claims.

I claim:

1. As a new article of manufacture, a seal for the purpose specified comprising a resilient sheet-metal disk, the marginal portion of said disk being flanged upwardly at substantially right angles to the central floor portion of the disk and then flared outwardly at substantially right angles to said flanged portion, both the flanged and flared portions being corrugated with relatively small crimps to thereby increase the flexibility of the flanged portion of the sheet metal and to improve its yieldability under an encircling pressure, said crimps reaching relatively close to the central floor portion of the disk, together with a liner on the bottom and outer faces of the seal, said liner comprising one or more layers of paper with a combined thickness suitable to insure compressibility of said liner against the sheet metal of the seal and substantially without distortion of the seal, substantially as described.

2. As a new article of manufacture, a seal for the purpose specified comprising a relatively thin sheet-metal disk having its marginal portion flared upwardly at substantially right angles to the central floor portion of the disk and having the extreme edge of said marginal portion flared outwardly at substantially right angles to said flanged portion, the flanged and flared portions being corrugated with relatively small crimps to thereby improve the yieldability of said portions under encircling pressure, said crimps reaching relatively close to the central floor portion of the disk, together with a suitable protecting coating for the surfaces of the seal which are exposed to the material being sealed substantially as described.

3. The combination with a jar having a relatively wide mouth and having an inwardly reaching encircling bead with a downwardly facing lower surface, of a seal therefor comprising a relatively thin sheet-metal disk of resilient material having its marginal portion flanged upwardly at substantially right angles to its central floor portion and its edge portion flared outwardly, said flanged and flared portions being corrugated with a series of relatively small crimps to thereby improve the yieldability of the marginal portion of the seal under encircling pressure, said crimps reaching relatively close to the central floor portion of the disk, together with a coating of yieldable material on the lower surface of the flanged portion which is adapted to come into contact with the bead aforesaid, the flanged portion of the seal having an initial size slightly larger than the size of the bead aforesaid, whereby when the seal is forced into place within the bead its marginal portion may yield slightly without buckling due to the presence of the crimps aforesaid, substantially as described.

HERBERT J. BRAGDON.